United States Patent
Nakajima et al.

(10) Patent No.: US 8,187,924 B2
(45) Date of Patent: May 29, 2012

(54) METHOD, DESIGN PROGRAM AND DESIGN SUPPORT DEVICE FOR SEMICONDUCTOR INTEGRATED CIRCUIT, AND SEMICONDUCTOR INTEGRATED CIRCUIT

(75) Inventors: Yohei Nakajima, Kanagawa (JP); Makoto Nonaka, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 155 days.

(21) Appl. No.: 12/826,235

(22) Filed: Jun. 29, 2010

(65) Prior Publication Data

US 2011/0024869 A1     Feb. 3, 2011

(30) Foreign Application Priority Data

Jul. 31, 2009  (JP) ................................ 2009-179305

(51) Int. Cl.
*H01L 21/82*     (2006.01)

(52) U.S. Cl. ............... 438/128; 438/E21.526; 257/204; 257/206; 257/449; 716/10; 716/11; 716/14; 716/17

(58) Field of Classification Search .................. 257/204, 257/206, 449, 706; 438/128–129; 716/8–11, 716/14, 17, 120
See application file for complete search history.

(56) References Cited

U.S. PATENT DOCUMENTS

| 5,124,776 | A | 6/1992 | Tanizawa et al. |
| 7,539,964 | B2 | 5/2009 | Anazawa |
| 8,043,900 | B2 * | 10/2011 | Shimizu et al. ............... 438/128 |

FOREIGN PATENT DOCUMENTS

| JP | 3-16155 A | 1/1991 |
| JP | 2007-258215 A | 10/2007 |

* cited by examiner

*Primary Examiner* — Dung A. Le
(74) *Attorney, Agent, or Firm* — Sughrue Mion, PLLC

(57) ABSTRACT

A design method for a semiconductor integrated circuit, includes: a first calculating step; a second calculating step; and a setting step. The first step is a step of calculating a consumption current amount of a layout target circuit based on circuit information. The second calculating step is a step of calculating a suppliable current amount per unit area in a region where a power can be supplied from a power wiring line. The setting step is a step of setting a cell size of the layout target circuit based on the consumption current amount so that a consumption current amount per unit area of the layout target circuit is smaller than the suppliable current amount per unit area.

22 Claims, 9 Drawing Sheets

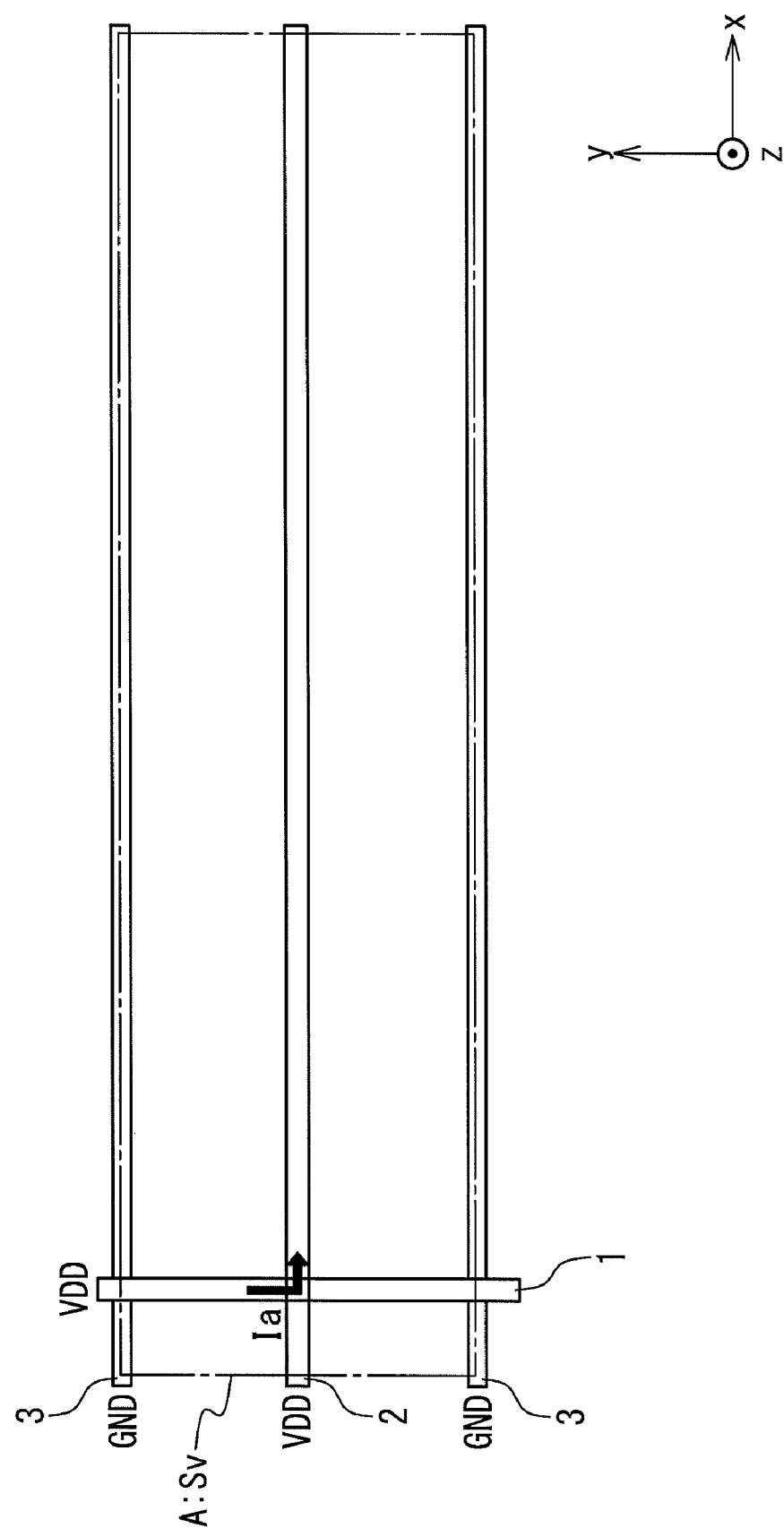

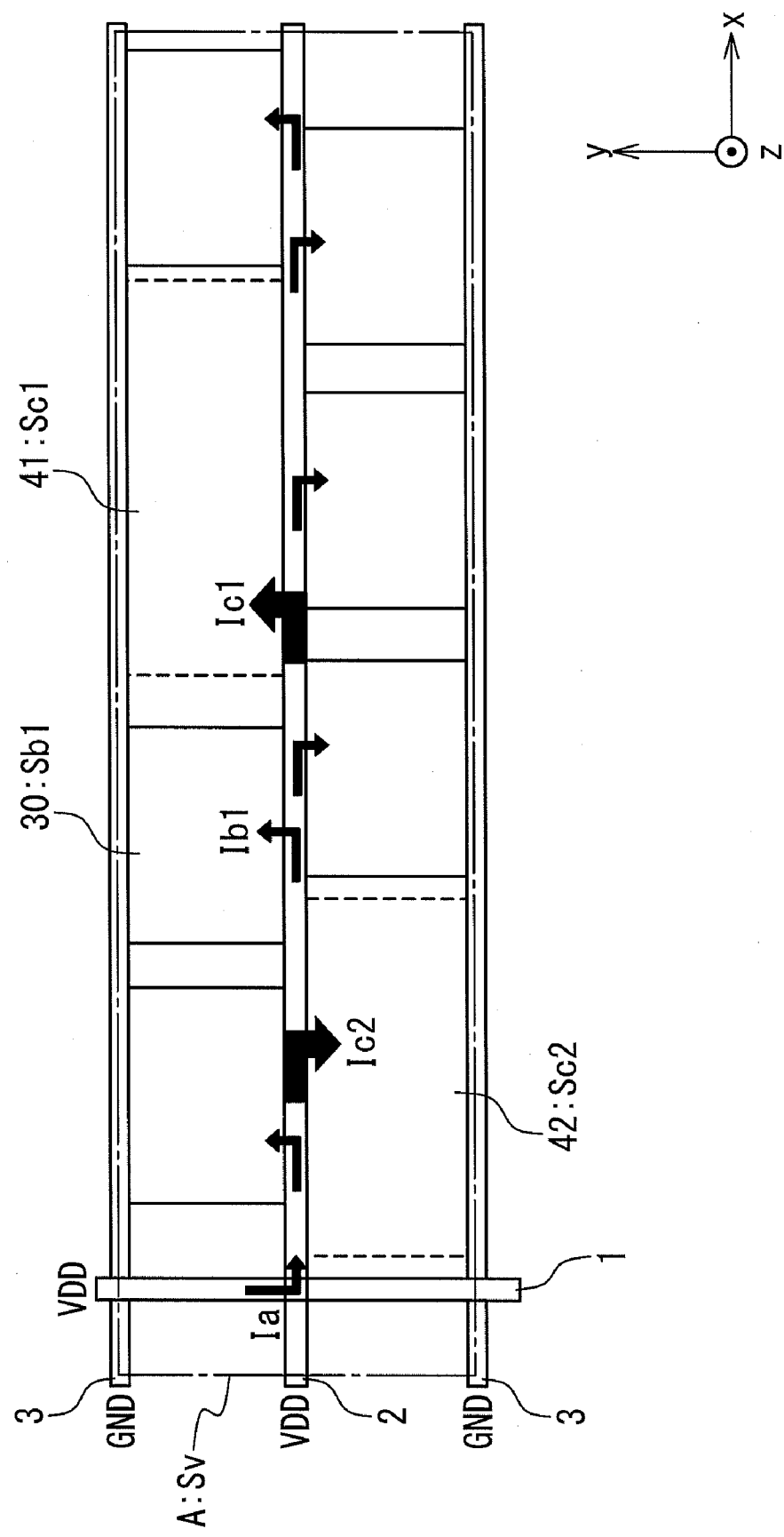

METHOD, DESIGN PROGRAM AND DESIGN SUPPORT DEVICE FOR SEMICONDUCTOR INTEGRATED CIRCUIT, AND SEMICONDUCTOR INTEGRATED CIRCUIT

INCORPORATION BY REFERENCE

This application is based upon and claims the benefit of priority from Japanese patent application No. 2009-179305 filed on Jul. 31, 2009, the disclosure of which is incorporated herein in its entirety by reference.

BACKGROUND OF THE INVENTION

1. Field of the Invention

The present invention relates to a design method, a design program and a design support device for a semiconductor integrated circuit, which generates a cell library of a cell base semiconductor integrated circuit.

2. Description of Related Art

A cell base IC (Integrated Circuit) is suitably used in LSIs requiring high integration and high performance such as microprocessors and ASSPs (Application Specific Standard Product) as well as ASICs (Application Specific Integrated Circuit). The cell base IC is designed by combining user-original circuits. Here, the user-original circuits are designed by a user using a cell library supplied from semiconductor manufacturers. The cell library includes cells of various types and sizes ranging from a primitive cell that mounts a basic circuit therein to a macro cell that mounts a CPU and a memory therein. Since circuit design is performed by a placement and routing tool placing such cells on a chip, a design time and design costs can be reduced. Furthermore, since layout of a CPU and the like can be incorporated as a macro cell as it is, a system LSI can be easily created.

Layout of the cell base IC is created through a cell layout phase when the cell library is created and a chip layout phase when cells are placed on a chip by using the cell library. FIG. 1 is a flow chart showing a layout operation in a general chip layout phase. In the chip layout phase, the cells are placed on the chip on which a power wiring line is previously arranged by using a previously prepared cell library 100 (Step S101). Thereby, chip layout information 101 is generated. For example, chip layout shown in FIG. 2 is obtained.

FIG. 2 is a plan view showing an example of a layout structure of a semiconductor integrated circuit (chip). Referring to FIG. 2, in the semiconductor integrated circuit, a power wiring line 1, a power wiring line 2, and a power wiring line 3 are arranged. The power wiring line 1 is supplied with a power source voltage VDD and extends in a column direction (Y direction). The power wiring line 2 (power source voltage VDD) is connected to the power wiring line 1 and extends in a row direction (X direction). The power wiring line 3 (ground voltage GND) extends in parallel to the power wiring line 2. The power wiring line 2 supplies the source voltage VDD to cells 30 to 32 arranged in a region A in the row. The chip layout information 101 representing such a layout structure is recorded in a storage device (not shown).

Next, it is tested whether or not chip layout has a defect. Generally, DRC (Design Rule Checking), LVS (Layout Versus Schematic), and ERC (Electrical Rule Checking) are performed. In the ERC, for example, it is tested whether or not a current amount that can be supplied from the power wiring line is equal to or larger than a consumption current amount of the cell. That is, the current amount per unit area that can be supplied from the power wiring line is compared with the consumption current amount per unit area of the cell (Step S102). Here, when the consumption current amount of the cell is large (No at Step S102), the flow proceeds to the chip layout step (Step S101) and chip layout is corrected.

In the example shown in FIG. 2, consumption current amounts of the cells 30, 31, 32 are defined as Ib1, Ib2, Ib3, respectively and cell sizes (areas) of the cells 30, 31, 32 are defined as Sb1, Sb2, Sb3, respectively. A current amount supplied from the power wiring line 2 is defined as Ia and an area of the region A where power can be supplied is defined as Sv. In this example, the consumption current amount per unit area of the cell 30 is represented by Ib1/Sb1, the consumption current amount per unit area of the cell 31 is represented by Ib2/Sb2, the consumption current amount per unit area of the cell 32 is represented by Ib3/Sb3, and the current amount per unit area that can be supplied from the power wiring line 2 is represented by Ia/Sv. Ib1/Sb1 is smaller than Ia/Sv, and each of Ib2/Sb2 and Ib3/Sb3 is larger than Ia/Sv. In this case, layout is corrected so as to improve current supply capacity to the cells 31, 32. For example, as shown in FIG. 3, the current supply capacity is improved by arranging a new power wiring line 5. Alternatively, the cell 32 having a large current consumption amount is arranged in a layer below an upper wiring line 6 and the source voltage VDD is directly supplied from the upper wiring line 6 to the cell 32 through a contact 7. In this manner, a necessary current can be supplied to the cells 31, 32 having a large current consumption amount.

When an electrical characteristic of the semiconductor integrated circuit falls within a desired range through chip layout correction, chip layout is fixed and the chip layout phase is finished (Yes at Step S102).

However, when the new power wiring line 5 is added in the layout correction, wiring line resource of a whole of the chip deteriorates. When layout is corrected so that the cell 32 is placed in the vicinity of the upper wiring line, the placement of the cell 32 is limited by a position of the upper wiring line 6. As a result, optimization (timing driven layout) of signal wiring line between the cell 32 and the other cell 30 may not be achieved.

In order to solve the problem accompanied with such a change of the power supply capacity, for example, Japanese Patent Publication No. JP2007-258215A (refer to as Patent literature 1: corresponding to U.S. Pat. No. 7,539,964 (B2)) and JP-A-Heisei 3-16155 (refer to as Patent literature 2: corresponding to U.S. Pat. No. 5,124,776 (A)) describe methods of optimizing the current amount supplied from the power wiring line and the consumption current amount of the cell by changing sizes of the placed cells.

FIG. 4 is a plan view showing a structure of chip layout after correction of the chip layout shown in FIG. 2 according to a design method described in patent literature 1. At Step S102, when the consumption current amount per unit area of each of the cells 31, 32 is larger than the current amount per unit area that can be supplied from the power wiring line, dummy areas 33, 34 are inserted into the cells 31, 32, respectively, thereby extending cell sizes of the cells 31, 32 to Sb4, Sb5, respectively. Whereby, the consumption current amounts per unit area of the cells 31, 32 become Ib2/Sb4, Ib3/Sb5, respectively, which each of them is smaller than the supplied current amount Ia/Sv.

As described above, according to the conventional technique, in the chip layout phase, it is need to change the arrangement of the cells and the power wiring lines or a cell size based on the current amount that can be supplied from the power wiring line. In this case, a design TAT (Turn Around Time) increases due to the optimization of the signal wiring accompanied with the layout correction, the cell displacement along with the cell extension, search of a position capable of arrangement and the like.

SUMMARY

The present invention seeks to solve one or more of the above problems, or to improve upon those problems at least in part.

In one embodiment, a design method for a semiconductor integrated circuit, includes: calculating a consumption current amount of a layout target circuit based on circuit information; calculating a suppliable current amount per unit area in a region where a power can be supplied from a power wiring line; setting a cell size of said layout target circuit based on said consumption current amount so that a consumption current amount per unit area of said layout target circuit is smaller than said suppliable current amount per unit area.

In another embodiment, a computer-readable medium includes code that, when executed, causes a computer to perform the following: calculating a consumption current amount of a layout target circuit based on circuit information; calculating a suppliable current amount per unit area in a region where a power can be supplied from a power wiring line; setting a cell size of said layout target circuit based on said consumption current amount so that a consumption current amount per unit area of said layout target circuit is smaller than said suppliable current amount per unit area.

In another embodiment, a design support device for a semiconductor integrated circuit, includes: a consumption current calculation portion configured to calculate a consumption current amount of a layout target circuit based on circuit information; a suppliable current calculation portion configured to calculate a suppliable current amount per unit area in a region where a power can be supplied from a power wiring line; a cell size setting portion configured to set a cell size of said layout target circuit based on said consumption current amount so that a consumption current amount per unit area of said layout target circuit is smaller than said suppliable current amount per unit area.

In another embodiment, a manufacturing method for a semiconductor integrated circuit, includes: forming a mask of a pattern based on chip layout information created by a design method for a semiconductor integrated circuit, said design method including: calculating a consumption current amount of a layout target circuit based on circuit information, calculating a suppliable current amount per unit area in a region where a power can be supplied from a power wiring line, setting a cell size of said layout target circuit based on said consumption current amount so that a consumption current amount per unit area of said layout target circuit is smaller than said suppliable current amount per unit area, performing layout of cells of said layout target circuit based on said set cell size, storing layout information of said cells in a cell library, placing said cells on a chip to perform layout of a semiconductor integrated circuit, and storing layout information of said semiconductor integrated circuit as said chip layout information in a storage device; and producing a semiconductor integrated circuit by using said mask.

In another embodiment, a manufacturing method for a semiconductor integrated circuit, includes: forming a mask of a pattern based on chip layout information created by a design method for a semiconductor integrated circuit, said design method including: calculating a consumption current amount of a layout target circuit based on circuit information, calculating a suppliable current amount per unit area in a region where a power can be supplied from a power wiring line, setting a cell size of said layout target circuit based on said consumption current amount so that a consumption current amount per unit area of said layout target circuit is smaller than said suppliable current amount per unit area, changing layout of cells of said layout target circuit based on said set cell size, and storing changed layout information of said cells in a cell library, placing said cells on a chip to perform layout of a semiconductor integrated circuit, and storing layout information of said semiconductor integrated circuit as said chip layout information in a storage device; and producing a semiconductor integrated circuit by using said mask.

In another embodiment, a semiconductor integrated circuit includes: a power wiring line; and a plurality of cells configured to be supplied with power voltage from said power wiring line, wherein a consumption current amount per unit area of each of said plurality of cells is equal to or smaller than a suppliable current amount per unit area in a region where said power voltage can be supplied from said power wiring line, and wherein said plurality of cells includes a cell that a cell size is larger than a cell size corresponding to a logic area and there is no dead space.

According to the present invention, a design TAT of a semiconductor integrated circuit can be reduced. Chip layout of the semiconductor integrated circuit can be easily achieved.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 8 is a plan view showing an example of a wiring structure before chip layout; and FIG. 9 is a plan view showing an example of a layout structure after the chip layout according to the present invention.

DESCRIPTION OF THE PREFERRED EMBODIMENTS

Figure 1:
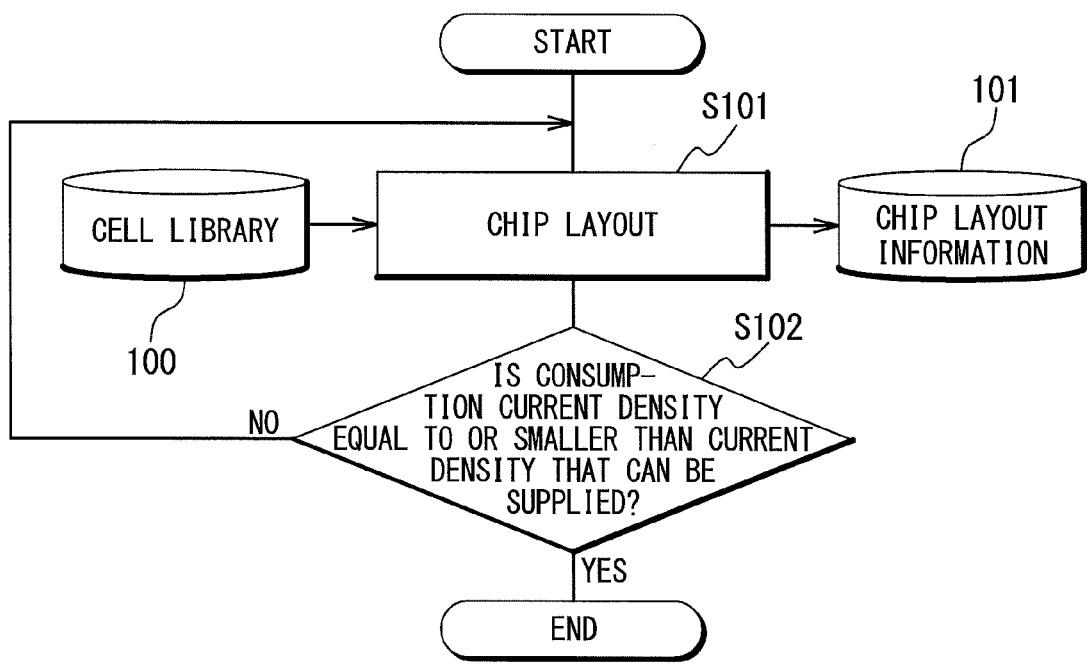
FIG. 1 is a flow chart showing a layout operation in a typical chip layout phase.
Figure 2:
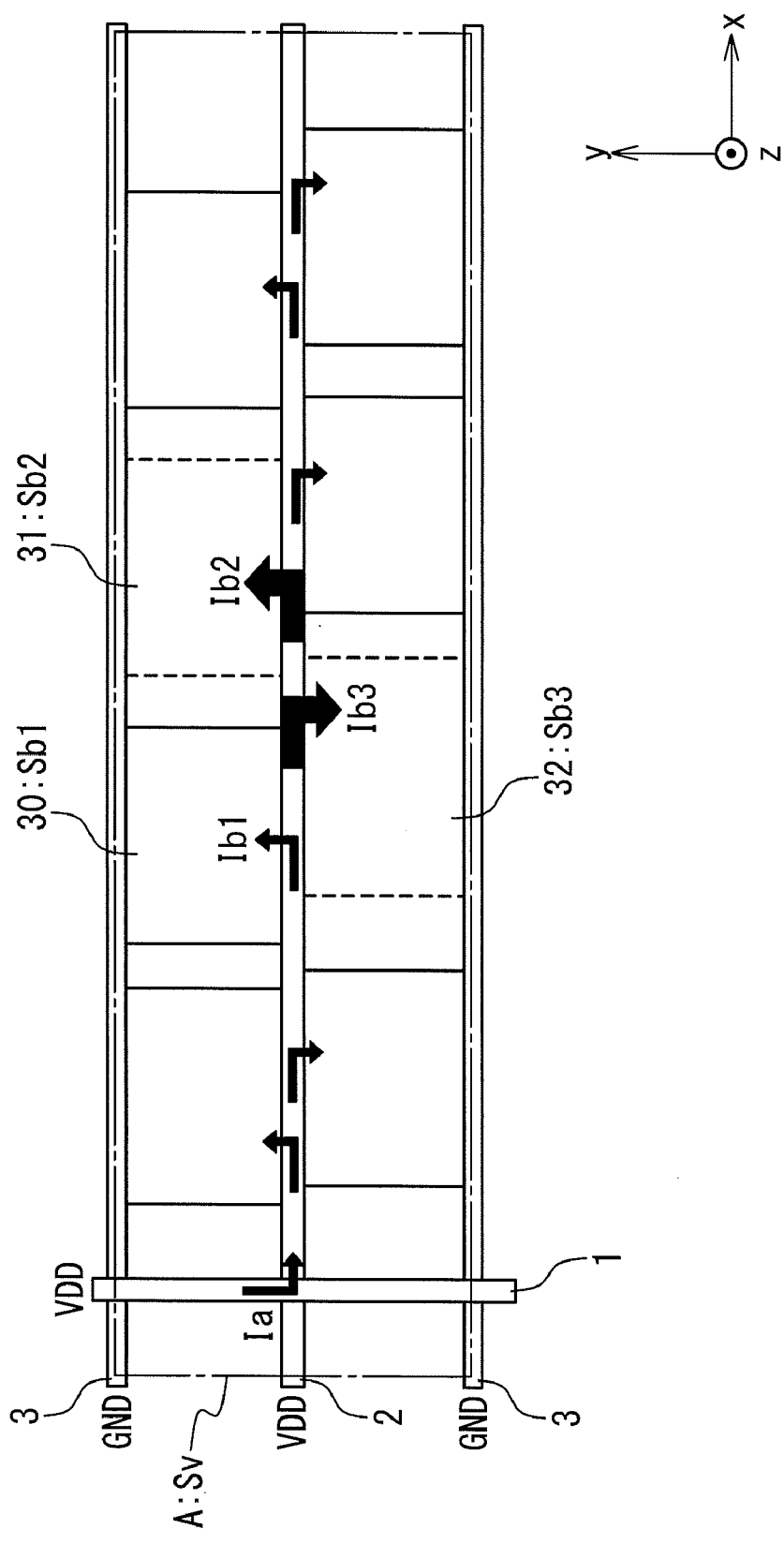
FIG. 2 is a plan view showing an example of a layout structure of a semiconductor integrated circuit (chip)
Figure 3:
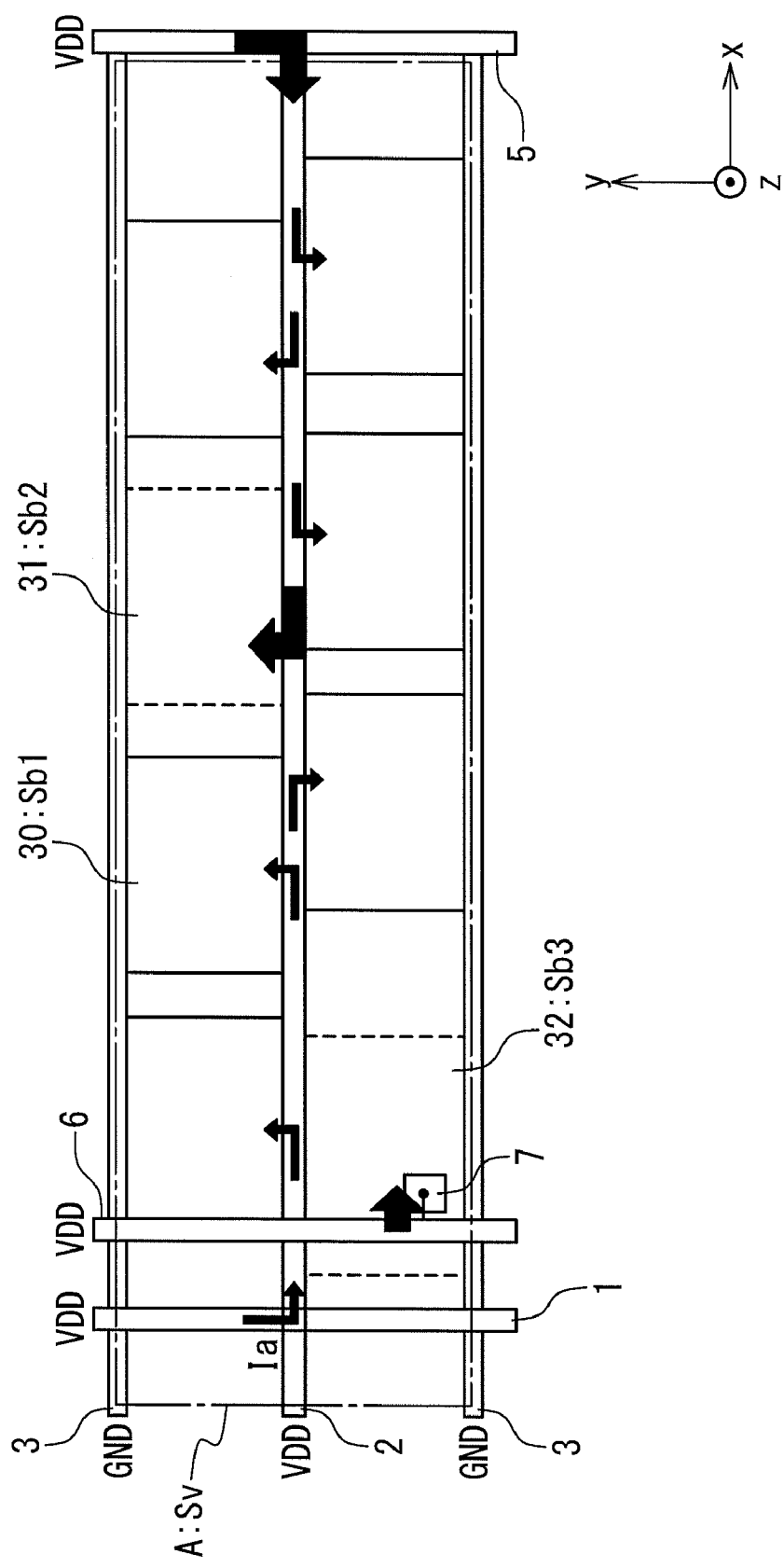
FIG. 3 is a plan view showing an example of a layout structure of a semiconductor integrated circuit (chip) after layout correction according to a conventional technique.

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Embodiments of the present invention will be described referring to attached drawings. In the drawings, the same or similar reference numerals denote the same, similar or equivalent elements.

Referring to the attached drawings, a design method, a design program, and a design support device for a semiconductor integrated circuit according to the present invention will be described below. In the present embodiment, the design support device of the semiconductor integrated circuit for designing the cell base IC (Integrated Circuit) will be described as an example.

(Configuration)

Figure 5:
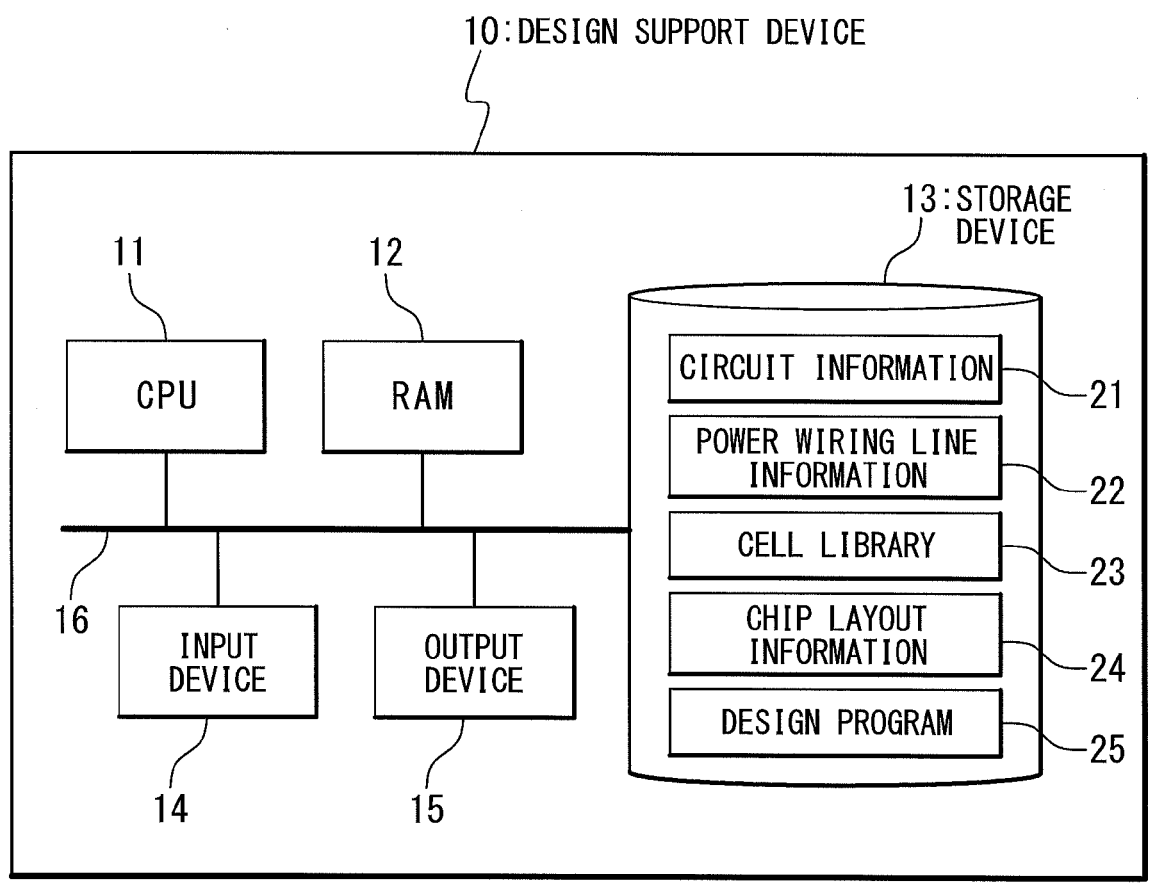
FIG. 5 is a diagram showing a configuration of a semiconductor integrated circuit design support device according to the present invention.
Figure 6:
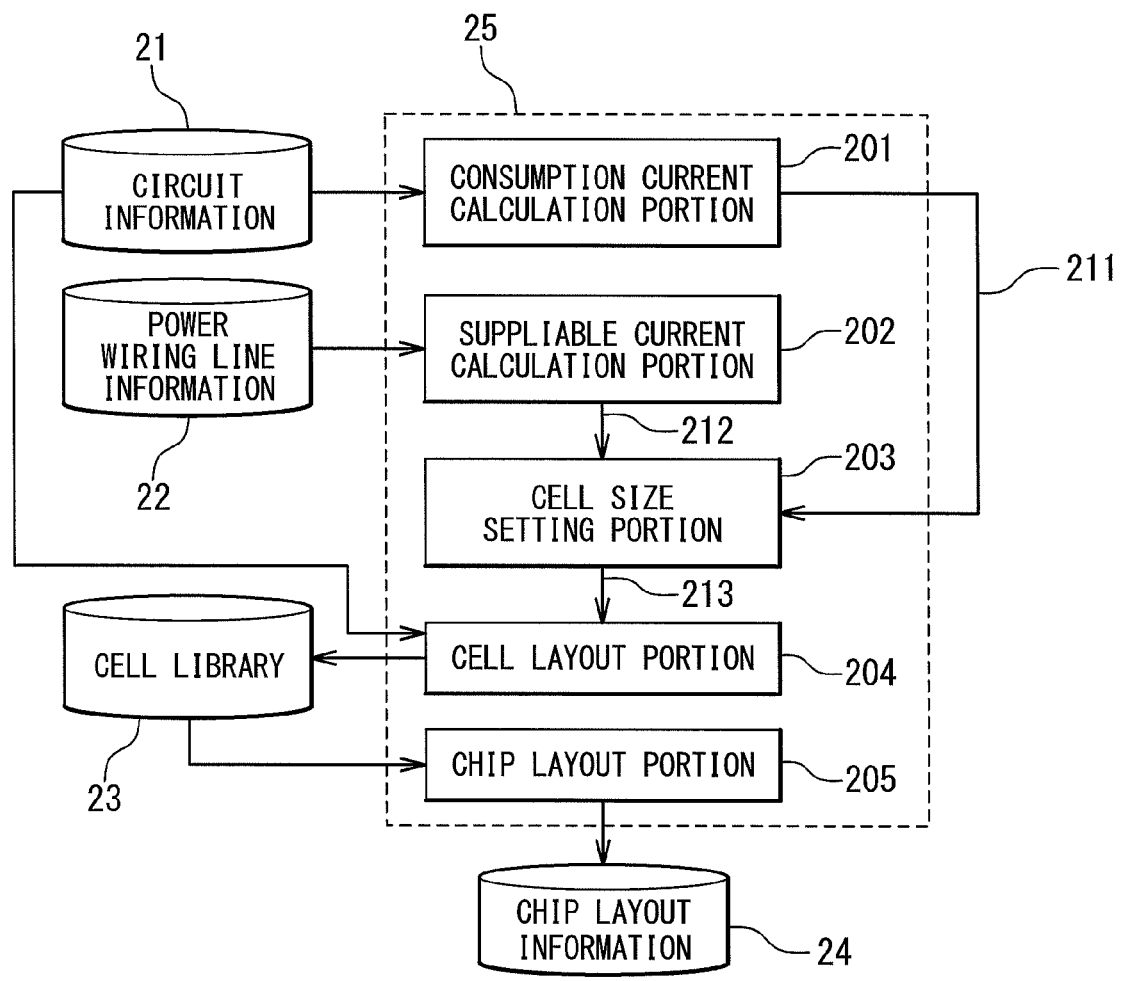
FIG. 6 is a functional block diagram showing functions of a design program according to the present invention.

Referring to FIGS. 5 and 6, a configuration of the design support device 10 for the semiconductor integrated circuit (hereinafter referred to as the design support device 10) in the present embodiment of the present invention will be described. FIG. 5 is a configuration diagram of the design support device 10 in the present embodiment of the present invention. The design support device 10 includes a CPU 11, a RAM 12, a storage device 13, an input device 14 and an output device 15 that are connected to one another through a bus 16. The storage device 13 is exemplified by a hard disk and a memory. The input device 14 such as a keyboard and a mouse is operated by a user to output various data to the CPU 11, the storage device 13 and the like. The output device 15 such as a monitor and a printer outputs a layout result of the semiconductor device, which is outputted from the CPU 11, to be visible to the user.

The storage device 13 has an area that circuit information 21, power wiring line information 22, a cell library 23, chip layout information 24, and a design program 25 are stored. In response to the input from an input device 14, the CPU 11 executes the design program 25 stored in the storage device 13 to perform cell layout and chip layout. At this time, various data and program that are sent from the storage device 13 are temporarily stored in the RAM 12 and the CPU 11 performs various processing using the data in the RAM 12.

The circuit information 21 includes element information and operational condition information. The element information is information relating to connecting relationship, a type and a size (the number of elements) of elements forming the cell (circuit). The element information includes a wiring line length, a wiring line width, a resistance value or a capacitance value, and a transistor driving capacity. The operational condition information is information relating to operational conditions of nonlinear active elements such as a diode and a transistor among the elements forming the circuit. The operational condition information includes information on a circuit wiring line load, an operating voltage (working voltage), an operating frequency, an operating factor (operating duty) and the like.

The power wiring line information 22 includes positional information on the power wiring line arranged on the semiconductor integrated circuit (chip) to be designed. For example, when the power wiring lines 1 to 3 are arranged as shown in FIG. 8, positional coordinates of the power wiring line 1 to 3 on the chip, the wiring line width, the source voltage supplied to the power wiring lines 1 to 3 and the like are recorded as the power wiring line information 22. Coordinates or area of the region A where the power wiring line 2 can supply a current may be included in the power wiring line information 22. The power wiring line information 22 may further include constraint information of the power wiring line in consideration of electromigration and IR drop.

The cell library 23 has one or a plurality of functions and is a set of data (hereinafter referred to as cell data) relating to cells (function cells) with their internal layout being previously designed. The cell data on a primitive cell including a basic circuit such as an NAND and a flip-flop, a decoupling capacity cell, a MIM capacity cell, and a macro cell including a large-scale circuit such as a RAM, a ROM, and a CPU core are recorded in the cell library 23. The cell data is also LEF (Library Exchange Format) data used to place and wire the cells on the semiconductor chip. The cell data includes data designating positions of the wiring lines and terminals in the cells, outlines of the cells, connecting positions of the wiring lines from outsides of the cells, and wiring line prohibition regions.

The chip layout information 24 is information on semiconductor chip layout designed in the chip layout phase. Describing in detail, the chip layout information 24 includes information on a position, a type and a size of the cells placed on the semiconductor chip, for example, in a GDS (Graphic Data System) format and information on a position and dimension of wiring line connecting the cells to each other.

The design program 25 is executed by the CPU 11 to perform functions of a consumption current calculation portion 201, a suppliable current calculation portion 202, a cell size setting portion 203, a cell layout portion 204 and a chip layout portion 205 as shown in FIG. 6.

Each of the functions implemented by executing the design program 25 will be described referring to FIG. 6.

The consumption current calculation portion 201 calculates a consumption current amount 211 in the circuit to be designed on the basis of the circuit information 21. For example, the consumption current calculation portion 201 calculates the consumption current amount 211 of the layout target circuit based on operating conditions such as an operating frequency, an operating factor and a wiring line load and a circuit configuration of the target circuit. It is preferred to select, for example, a circuit having the operating frequency or the driving current that is larger than a predetermined value as a target circuit for calculation of the consumption current amount 211. When the power wiring lines are richly (densely) arranged, a threshold value (driving current, operating frequency) for selecting the calculation target cell is set to be a large value. In this case, a circuit having a larger driving current or a higher operating frequency is selected as the target circuit for calculation of the consumption current amount 211. On the contrary, when the power wiring lines are poorly (roughly) arranged, it is preferred that the threshold value (driving current, operating frequency) for selecting the calculation target cell is set to be a smaller value than the value set in the case of the richly arranged power wiring lines. In this case, a circuit having a smaller driving current or a lower operating frequency than a driving current or an operating frequency in the case of the richly arranged power wiring lines is also selected as the target circuit for calculation of the consumption current amount 211.

The suppliable current calculation portion 202 calculates the current amount (hereinafter referred to as suppliable current amount 212) that can be supplied per unit area in a region where power can be supplied from the power wiring line arranged on the chip on the basis of the power wiring line information 22. Describing in detail, the suppliable current calculation portion 202 finds a current amount that can be supplied from the power wiring line and the area of a region where the current can be supplied on the basis of the power wiring line information 22 and calculates the suppliable current amount 212 per unit area by using them. At this time, it is preferred that the suppliable current calculation portion 202 calculates the suppliable current amount 212 in consideration of electromigration and IR drop.

The cell size setting portion 203 sets a cell size 213 of the layout target circuit. Describing in detail, the cell size setting portion 203 calculates the cell size 213 of a cell selected as a target for calculation of the consumption current amount 211 on the basis of the suppliable current amount 212. The cell size setting portion 203 sets the cell size 213 so that the consumption current amount per cell size is equal to or smaller than the suppliable current amount 212. The cell size 213 of the other cell (circuit) is set as in a conventional manner.

The cell layout portion 204 determines cell layout by using the set cell size 213, the circuit information 21, a design tool not shown, and the like. According to the cell layout method, size of each of elements that perform logical functions of the target to be designed is found and each element is placed so that useless region (dead space) is not left in a cell frame according to the cell size 213. At this time, when a region as the dead space is generated, it is preferred to insert a capacity cell or the like. Cell layout information generated by the cell layout portion 204 is registered in the cell library 23 as the cell data.

The chip layout portion 205 arranges cells and signal lines connecting the cells to each other on the chip by using the cell library 23 and a net list (not shown). Here, the cells are arranged (placed) with the objective of minimizing a total wiring line length between the cells and a wiring delay time. In addition, layout correction is performed according to DRC, LVS, ERC and their test results. However, the chip layout portion 205 according to the present invention does not test whether or not the cell consumption current at Step S102 described above is equal to or lower than the current that can be supplied from the power wiring line. Chip layout information determined by the chip layout portion 205 is recorded in the storage device 13 as the chip layout information 24.

With such a configuration, the design support device 10 according to the present invention, in the cell layout phase, determines a cell size according to the current supply capacity of the power wiring line. Only a cell (circuit) having a large driving current or a high operating frequency is subjected to this processing and cell sizes of the other cells (unselected cells) are determined as in the conventional manner. Since the cell size is determined according to the current supply capacity of the power wiring line, the consumption current amount of the cell arranged in the chip layout phase does not exceed the current supply capacity of the power wiring line. For this reason, it is possible to omit conventional testing whether the consumption current amount of the cell is equal to or smaller than the suppliable current amount of the power wiring line.

Figure 7:
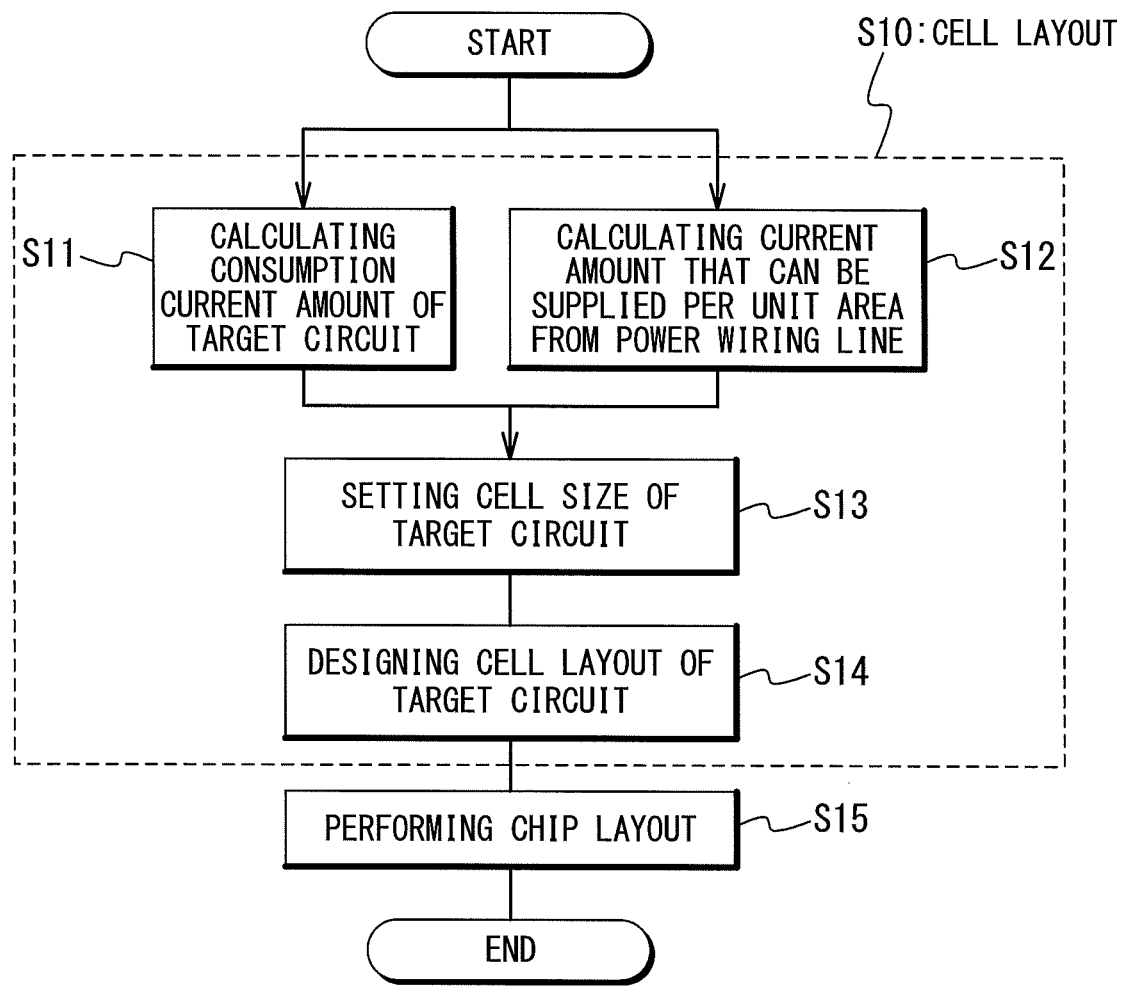
FIG. 7 is a flow chart showing an operation of designing the semiconductor integrated circuit according to the present invention.

Referring to FIGS. 7 and 9, an operation of designing the semiconductor integrated circuit according to the present invention will be described in detail. FIG. 7 is a flow chart showing the operation of designing the semiconductor integrated circuit according to the present invention. FIG. 8 is a plan view showing an example of a wiring line structure before chip layout. FIG. 9 is a plan view showing an example of a layout structure after chip layout according to the present invention. Here, it is assumed that the power wiring lines 1 to 3 are arranged on the chip as shown in FIG. 8. Describing in detail, the power wiring line 1 that receives the power source voltage VDD and extends in a column direction, the power wiring line 2 (power source voltage VDD) that is connected to the power wiring line 1 and extends in a row direction (X direction), and the power wiring line 3 (ground voltage GND) extends in parallel to the power wiring line 2 are arranged on the chip. It is assumed that cells 41, 42 are selected as the target cells for calculation of the consumption current amount 211 (cell size setting target cells).

Here, the cell whose consumption current amount in the chip can be estimated in the cell design stage is selected as the cell size setting target cell. Specifically, the cell that has a usage condition (operating condition) already limited based on design specifications and has possibly an effect on current supply from the power wiring line (high driving cell, cell used with long wiring line) is selected as the cell size setting target cell. For example, the circuit having the driving current amount or the operating frequency that is larger than a predetermined threshold value is selected as the cell size setting target cell.

Referring to FIG. 7, the design support device 10 calculates the consumption current amount 211 of the cell size setting target cell (circuit) (Step S11). Here, the consumption current amount 211 of the cell is calculated under conditions based on an actual operation of the cell size setting target cell (wiring line load, frequency, operating factor, etc.). Furthermore, the design support device 10 calculates the current amount that can be supplied per unit area from the arranged power wiring line 2 (suppliable current amount 212) (Step S12). Here, according to constraints such as electromigration and IR drop, the suppliable current amount 212 is calculated. For example, the suppliable current amount 212 per unit area (Ia/SV) is calculated based on the area Sv of the region A where power can be supplied and the suppliable current amount Ia shown in FIG. 8. Here, the power suppliable region A refers to the region where power is supplied from the power wiring line 2 in the region where the cell can be arranged. For example, when the power wiring line 2 extends in the row direction (X direction) as shown in FIG. 8, a region between one row placed in an upper direction (Y direction) and another row placed in a lower direction (Y direction) with respect to the power wiring line 2 is the power suppliable region A.

The design support device 10 sets the cell size of each of the target circuits (cells 41, 42) based on the consumption current amount 211 and the suppliable current amount 212 (Step S13). Here, it is defined that the consumption current amounts 211 of the cells 30, 41, 42 are Ib1, Ic1, Ic2, respectively, the current amount supplied from the power wiring line 2 is Ia, and the area of the power suppliable region A is Sv. At Step S103, the design support device 10 sets the cell sizes 213 (areas: Sc1, Sc2) of the cells 41, 42 so that each of the consumption current amount per unit area Ic1/Sc1 of the cell 41 and the consumption current amount per unit area Ic2/Sc2 of the cell 42 is smaller than the suppliable current amount 212 (Ia/Sv).

The design support device 10 designs the layout of the cells 41, 42 based on the set cell sizes 213 (Sc1, Sc2) (Step S14). Here, logical circuits are laid out in a cell frame defined by the cell size 213. Cell layout processing at Step S14 is performed as in the conventional manner. That is, a gate and a diffusion layer are laid out based on the process and the operating conditions, and the wiring line resource in the cell is optimized. When the set cell size 213 is larger than a size corresponding to a logical region, a capacity cell may be added to a region other than the logical region.

Through the cell layout step (Step S10) from Step S11 to S14, various circuits (macro cell, standard cell and primitive cell) are laid out and respective cell data is recorded in the cell library 23. The cell size of the other circuit (cell 30) is set as in the conventional manner. Here, Sb1 is set as the cell size. The other cell 30 is also laid out as in the conventional manner. Since the consumption current amount per unit area (Ib1/Sb1) of the cell 30 is equal to or smaller than the current amount per unit area (Ia/Sv) that can be supplied from the power wiring line 2, it is no need to set the cell size based on the consumption current amount as described above.

The design support device 10 may execute the processing at Step S11 to S14 by using the previously prepared cell library 23 to change the previously set cell sizes. In this case, the cell data of the cells 41, 42 whose cell sizes are set based on the consumption current amounts is selected from the cell library 23. Then, as described above, the cell size 213 is set based on the consumption current amount by executing the processing at Step S11 to S13. At Step S14, cell layout (cell data) is corrected to achieve the set cell size 213. Here, the target cell for change of the cell size may be selected based on the consumption current amount, the operating frequency and whether or not the consumption current amount per unit area of the cell is equal to or larger than a threshold value.

The design support device 10 performs chip layout by using the cell library 23 generated or corrected in the cell layout phase (Step S10) (Step S15). Here, as shown in FIG. 9, the cells 30, 41, 42 are arranged on the chip. A chip layout result is recorded as the chip layout information 24.

According to the conventional technique, after chip layout, it is need to test whether or not the power supply capacity of the power wiring line exceeds the consumption current amount of the placed cell. However, according to the present invention, the current amount per unit area of each of the all cells placed on the chip is set in the cell layout phase so as to be equal to or smaller than the suppliable current amount from the power wiring line. For this reason, according to the present invention, chip layout can be performed without testing the current supply capacity to the cell, such testing being conventionally required. Furthermore, according to the present invention, it is no need to correct layout after chip layout by changing the arrangement and size of the cell having a large consumption current amount or adding a new power source. For this reason, time for layout correction and time for testing electrical characteristic after layout correction can be reduced, thereby greatly reducing design TAT.

Figure 4:
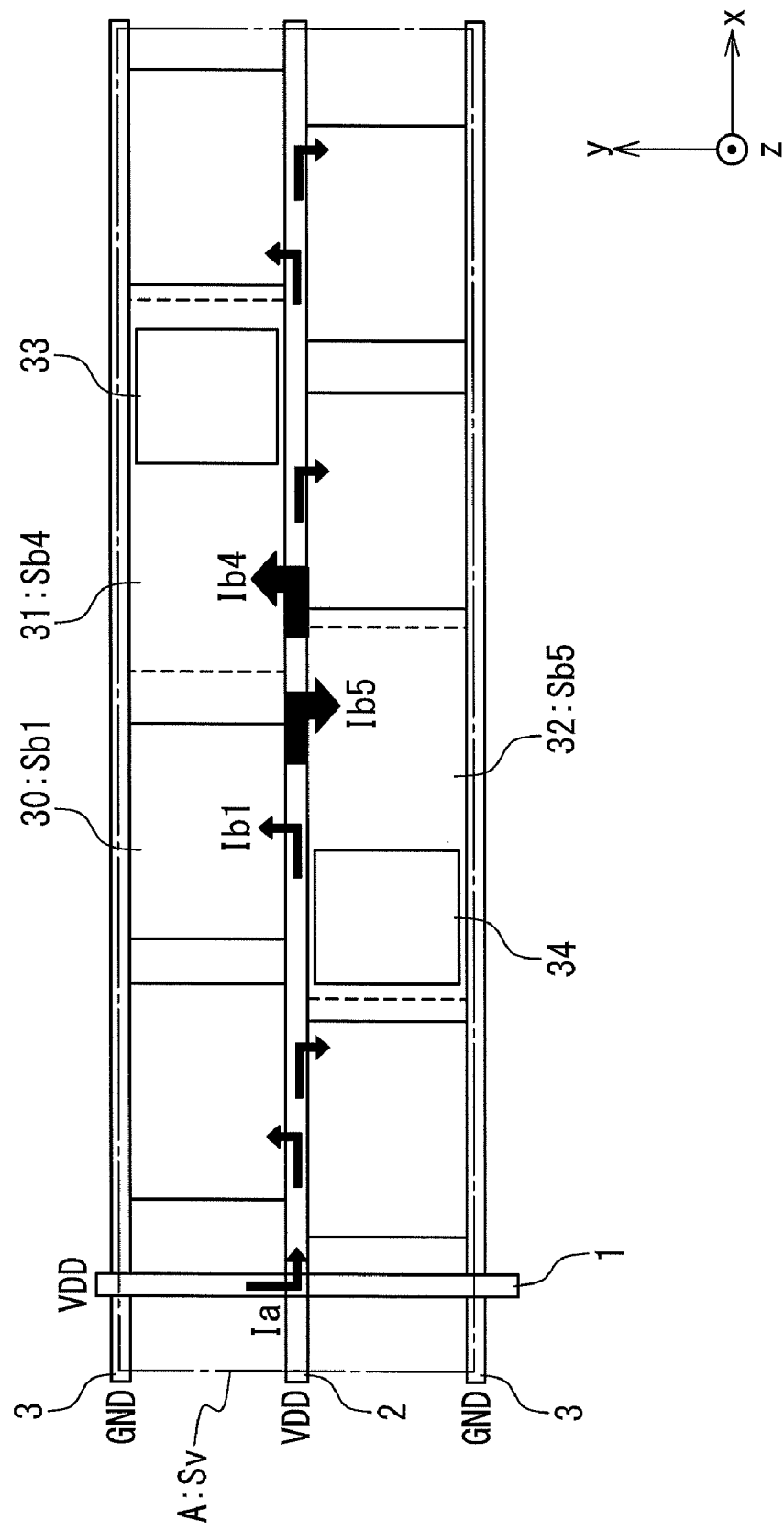
FIG. 4 is a plan view showing another example of a layout structure of the semiconductor integrated circuit (chip) after layout correction according to the conventional technique.

Furthermore, it is no need to extend the cell size set in the cell layout phase in the chip layout phase. In an example shown in FIG. 4, since the dummy area 33 is inserted to extend the cell size of the cell 31 and the dummy area 34 is inserted to extend the cell size of the cell 32, useless regions are added to the cells and the chip. However, according to the present invention, the logical region is laid out in the size set in the cell layout phase and the capacity cell and the like may be added to a region other than the logical region. In this manner, according to the present invention, the region other than the logical region in the cell can be effectively used.

Furthermore, since each of the consumption current amounts of the cells 30, 41, 42 prepared in the cell library 23 is equal to or smaller than the suppliable current amount from the power wiring line 2, even when the cells 30, 41, 42 are freely placed with respect to the region A where power can be supplied from the power wiring line 2, power supply to the cells can be stabilized. For this reason, chip layout of the semiconductor integrated circuit can be easily performed.

In a manufacturing process, a mask is formed on a silicon substrate surface by using the chip layout information 24 and the processing such as etching and so on is performed to manufacture the semiconductor integrated circuit. According to the present invention, since the cell having a consumption current density based on the power supply capacity is arranged on the chip. In other words, the cell having the cell size that is larger than the cell size corresponding to the logical region of the cell exists without a dead space. Thus, the cell consumption current density is smaller than the suppliable current amount and therefore, the semiconductor integrated circuit that can stably supply power to the cell can be manufactured.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

Although the present invention has been described above in connection with several exemplary embodiments thereof, it would be apparent to those skilled in the art that those embodiments are provided solely for illustrating the present invention, and should not be relied upon to construe the appended claims in a limiting sense.

What is claimed is:

1. A design method for a semiconductor integrated circuit, comprising:
    calculating a consumption current amount of a layout target circuit based on circuit information;
    calculating a suppliable current amount per unit area in a region where a power can be supplied from a power wiring line;
    setting a cell size of said layout target circuit based on said consumption current amount so that a consumption current amount per unit area of said layout target circuit is smaller than said suppliable current amount per unit area.

2. The design method for a semiconductor integrated circuit according to claim 1, further comprising:
    selecting a circuit that a driving current amount is larger than a threshold value as said layout target circuit.

3. The design method for a semiconductor integrated circuit according to claim 1, further comprising:
    selecting a circuit that an operation frequency is higher than a threshold value as said layout target circuit.

4. The design method for a semiconductor integrated circuit according to claim 1, further comprising:
    performing layout of cells of said layout target circuit based on said set cell size; and
    storing layout information of said cells in a cell library.

5. The design method for a semiconductor integrated circuit according to claim 4, further comprising:
    placing said cells on a chip to perform layout of a semiconductor integrated circuit; and
    storing layout information of said semiconductor integrated circuit as chip layout information in a storage device.

6. The design method for a semiconductor integrated circuit according to claim 1, further comprising:
    changing layout of cells of said layout target circuit based on said set cell size; and
    storing changed layout information of said cells in a cell library.

7. The design method for a semiconductor integrated circuit according to claim 6, further comprising:
    placing said cells on a chip to perform layout of a semiconductor integrated circuit; and
    storing layout information of said semiconductor integrated circuit as chip layout information in a storage device.

8. A computer-readable medium comprising code that, when executed, causes a computer to perform the following:
    calculating a consumption current amount of a layout target circuit based on circuit information;

calculating a suppliable current amount per unit area in a region where a power can be supplied from a power wiring line;

setting a cell size of said layout target circuit based on said consumption current amount so that a consumption current amount per unit area of said layout target circuit is smaller than said suppliable current amount per unit area.

9. The computer-readable medium according to claim 8, further comprising:

selecting a circuit that a driving current amount is larger than a threshold value as said layout target circuit.

10. The computer-readable medium according to claim 8, further comprising:

selecting a circuit that an operation frequency is higher than a threshold value as said layout target circuit.

11. The computer-readable medium according to claim 8, further comprising:

performing layout of cells of said layout target circuit based on said set cell size; and storing layout information of said cells in a cell library.

12. The computer-readable medium according to claim 11, further comprising:

placing said cells on a chip to perform layout of a semiconductor integrated circuit; and storing layout information of said semiconductor integrated circuit as chip layout information in a storage device.

13. The computer-readable medium according to claim 8, further comprising:

changing layout of cells of said layout target circuit based on said set cell size; and storing changed layout information of said cells in a cell library.

14. The computer-readable medium according to claim 13, further comprising:

placing said cells on a chip to perform layout of a semiconductor integrated circuit; and storing layout information of said semiconductor integrated circuit as chip layout information in a storage device.

15. A design support device for a semiconductor integrated circuit, comprising:

a consumption current calculation portion configured to calculate a consumption current amount of a layout target circuit based on circuit information;

a suppliable current calculation portion configured to calculate a suppliable current amount per unit area in a region where a power can be supplied from a power wiring line;

a cell size setting portion configured to set a cell size of said layout target circuit based on said consumption current amount so that a consumption current amount per unit area of said layout target circuit is smaller than said suppliable current amount per unit area.

16. The design support device for a semiconductor integrated circuit according to claim 15, further comprising:

a cell layout portion configured to perform layout of cells of said layout target circuit based on said set cell size to create layout information; and a cell library configured to store said layout information of said cells.

17. The design support device for a semiconductor integrated circuit according to claim 16, further comprising:

a chip layout portion configured to place said cells on a chip to perform layout of a semiconductor integrated circuit and create chip layout information; and a storage device configured to store said chip layout information.

18. The design support device for a semiconductor integrated circuit according to claim 15, further comprising:

a cell layout portion configured to change layout of cells of said layout target circuit based on said set cell size to create layout information; and a cell library configured to store said layout information of said cells.

19. The design support device for a semiconductor integrated circuit according to claim 16, further comprising:

a chip layout portion configured to place said cells on a chip to perform layout of a semiconductor integrated circuit and create chip layout information; and a storage device configured to store said chip layout information.

20. A manufacturing method for a semiconductor integrated circuit, comprising:

forming a mask of a pattern based on chip layout information created by a design method for a semiconductor integrated circuit, said design method including:

calculating a consumption current amount of a layout target circuit based on circuit information, calculating a suppliable current amount per unit area in a region where a power can be supplied from a power wiring line, setting a cell size of said layout target circuit based on said consumption current amount so that a consumption current amount per unit area of said layout target circuit is smaller than said suppliable current amount per unit area, performing layout of cells of said layout target circuit based on said set cell size, storing layout information of said cells in a cell library, placing said cells on a chip to perform layout of a semiconductor integrated circuit, and storing layout information of said semiconductor integrated circuit as said chip layout information in a storage device; and producing a semiconductor integrated circuit by using said mask.

21. A manufacturing method for a semiconductor integrated circuit, comprising:

forming a mask of a pattern based on chip layout information created by a design method for a semiconductor integrated circuit, said design method including:

calculating a consumption current amount of a layout target circuit based on circuit information, calculating a suppliable current amount per unit area in a region where a power can be supplied from a power wiring line, setting a cell size of said layout target circuit based on said consumption current amount so that a consumption current amount per unit area of said layout target circuit is smaller than said suppliable current amount per unit area, changing layout of cells of said layout target circuit based on said set cell size, and storing changed layout information of said cells in a cell library, placing said cells on a chip to perform layout of a semiconductor integrated circuit, and storing layout information of said semiconductor integrated circuit as said chip layout information in a storage device; and producing a semiconductor integrated circuit by using said mask.

22. A semiconductor integrated circuit comprising:
a power wiring line; and
a plurality of cells configured to be supplied with power voltage from said power wiring line,
wherein a consumption current amount per unit area of each of said plurality of cells is equal to or smaller than a suppliable current amount per unit area in a region where said power voltage can be supplied from said power wiring line, and
wherein said plurality of cells includes a cell that a cell size is larger than a cell size corresponding to a logic area and there is no dead space.

* * * * *